United States Patent
Reimann et al.

(10) Patent No.: US 6,837,824 B2
(45) Date of Patent: Jan. 4, 2005

(54) FINAL CONTROL ELEMENT FOR A VEHICLE STEERING SYSTEM

(75) Inventors: Gerd Reimann, Abstatt (DE); Michael Bock, Asperg (DE); Willi Nagel, Remseck/Hochdorf (DE); Rolf Knecht, Ditzingen (DE); Heinz Gert Hagedorn, Rottweil (DE); Ruediger Tinter, Huefingen (DE); Stephan Oberle, Villingen-Schwenningen (DE); Ralph Eble, Unterkirnach (DE)

(73) Assignees: Robert Bosch GmbH, Stuttgart (DE); (part interest); IMS Morat Soehne GmbH, Donaueschingen (DE); (part interest)

( * ) Notice: Subject to any disclaimer, the term of this patent is extended or adjusted under 35 U.S.C. 154(b) by 0 days.

(21) Appl. No.: 10/169,583

(22) PCT Filed: Jan. 4, 2001

(86) PCT No.: PCT/DE01/00010

§ 371 (c)(1),
(2), (4) Date: Feb. 6, 2003

(87) PCT Pub. No.: WO01/49554

PCT Pub. Date: Jul. 12, 2001

(65) Prior Publication Data

US 2003/0148846 A1 Aug. 7, 2003

(30) Foreign Application Priority Data

Jan. 5, 2000 (DE) .......................................... 100 00 219

(51) Int. Cl.⁷ .............................................. F16H 57/08
(52) U.S. Cl. ............................... 475/343; 475/4; 475/7; 475/207; 74/440; 74/425; 74/409; 74/388 PS; 74/665; 180/443; 180/444
(58) Field of Search ............................... 475/343, 4, 7, 475/207; 74/440, 409, 425, 388 PS, 665; 180/443, 444

(56) References Cited

U.S. PATENT DOCUMENTS

| | | | | | |
|---|---|---|---|---|---|
| 4,530,413 A | * | 7/1985 | Buike et al. | ................. | 180/444 |
| 4,554,842 A | * | 11/1985 | Wood, III | ..................... | 74/409 |
| 4,556,116 A | * | 12/1985 | O'Neil | ....................... | 180/444 |
| 4,715,462 A | * | 12/1987 | Taig | ............................ | 180/444 |
| 4,765,425 A | * | 8/1988 | Saito et al. | ................. | 180/444 |
| 4,862,982 A | * | 9/1989 | Saito et al. | ................. | 180/443 |
| 4,932,492 A | * | 6/1990 | Sauvageot et al. | .......... | 180/446 |
| 5,435,794 A | * | 7/1995 | Mori et al. | ................. | 475/343 |
| 5,762,162 A | * | 6/1998 | Bodtker | ..................... | 180/444 |
| 5,934,144 A | * | 8/1999 | Marinkovic | ................. | 74/440 |
| 6,250,420 B1 | * | 6/2001 | Brenner et al. | ............. | 180/443 |
| 6,354,395 B1 | * | 3/2002 | Cheng et al. | ............... | 180/444 |

FOREIGN PATENT DOCUMENTS

JP 04069437 A * 3/1992 ............. F61H/1/28

* cited by examiner

*Primary Examiner*—Saul Rodriguez
*Assistant Examiner*—David D. Le
(74) *Attorney, Agent, or Firm*—Ronald E. Greigg

(57) ABSTRACT

A final control element for superimposed steering engagement of a vehicle steering system with a superposition gear having two input shafts and one output shaft, in order to attain a radial freedom from play, the superposition gear is provided with a two-stage, modified planetary gear, having a planet carrier, at least one stepped planet comprising two axially aligned planet wheels connected to one another fixed against relative rotation, and two sun wheels or ray wheels; the first input shaft is connected to one sun or ray wheel, and the output shaft is connected to the other sun or ray wheel, fixed against relative rotation, while the planet carrier is drivable via the second input shaft, and the at least one stepped planet and the sun wheels are biasing toward provided for suppressing a tooth flank play that occurs between.

25 Claims, 3 Drawing Sheets

FINAL CONTROL ELEMENT FOR A VEHICLE STEERING SYSTEM

CROSS-REFERENCE TO RELATED APPLICATIONS

This application is a 35 U.S.C. 371 application of PCT/DE 01/00010, filed on Jan. 4, 2001.

BACKGROUND OF THE INVENTION

1. Field of the Invention

The invention is directed to a final control element for superimposed steering engagement in a vehicle steering system in which the steering angle of the vehicle wheels is varied independently of the steering wheel angle, which has advantages in terms of driving dynamics, driving safety, and travel comfort.

2. Description of the Prior Art

In a known final control element of the type defined at the outset (German Patent Disclosure DE 38 30 654 A1), the superposition gear is embodied as a single-stage planetary gear with a planet carrier, planet wheels, sun wheel and ring gear; the sun wheel is connected to the first input shaft and the ring gear to the output shaft, in each case in a manner fixed against relative rotation, and the planet carrier is in geared connection with the second input shaft via a worm gear. The first input shaft is drivingly connected to the steering wheel, and the output shaft is drivingly connected to the steered vehicle wheels, or steering gear members necessarily coupled to them. The worm gear, driven by an electric motor, is embodied as self-locking. Sensors are disposed on the first input shaft and on the output shaft, and their signals represent the rotary position of the respective shaft. The signals are delivered to a regulating device, which controls the electric motor that engages the second input shaft.

The final control element of the invention has the advantage that with the modification according to the invention of a two-stage planetary gear, the prerequisites for a superposition gear free of radial play are created, and the superposition gear can then be embodied by means of further provisions. This kind of play-free superposition gear is required, since components in the steering train must in principle be free of play. Embodying the two-stage planetary gear with sun wheels has the advantage that the sun wheels can be milled directly onto the input shaft and output shaft, and production costs are saved by omitting the expensive metal ring gears, while the length and diameter of the final control element can also be minimized.

In a preferred embodiment of the invention, means for suppressing tooth flank play between the at least one stepped planet and the sun wheels are provided. Preferably, these means for suppressing the tooth flank play have a radially resilient bearing of the at least one stepped planet on the planet carrier; preferably, at least three stepped planets are disposed on the planet carrier, one of which is supported radially resiliently. The two planet wheels pressed against a stepped planet have different angular positions in the stepped planets. The suppression of the tooth flank play that is typically present in all planetary gears guarantees the freedom from play in the transmission of rotational angles from the first input shaft to the output shaft when the electric motor is inactive. Because of the resilient bearing of one of the stepped planets, this stepped planet exerts a radial pressing force against the sun wheels meshing with the stepped planets, so that the tooth flanks always rest on one another by nonpositive engagement in every rotational position.

In an advantageous embodiment of the invention, the stepped planets are each seated on a respective shaft, whose ends are received in a respective bearing point embodied in the planet carrier, and the bearing points of at least one shaft are embodied resiliently. The stepped planets can preferably be received rotatably on their axes via a slide bearing, or the shafts can be slidingly supported in the bearing points and the stepped planets can be disposed in a manner fixed against relative rotation on their axes. The resilient embodiment of the bearing points, in an advantageous embodiment of the invention, can be achieved by providing that each of the two bearing points is disposed on a bending arm, one arm end of which is fixed spring-elastically to the planet carrier. The bending arm is embodied such that once the planetary gear is mounted, it generates a virtually radial tensing force oriented toward the meshing sun wheels.

In an advantageous embodiment of the invention, a worm gear embodied as self-locking, with a worm connected to the input shaft in a manner fixed against relative rotation and a worm wheel connected to the planet carrier in a manner fixed against relative rotation is disposed between the second input shaft and the planet carrier. Coupled to the worm wheel is a coaxial, smaller worm wheel via an annular spring, in such a way that the tooth flanks of the two worm wheels rest on both sides of the tooth flanks of the worm. By means of these structural provisions, an equalization of play between the worm gear and the planetary gear is attained, thus making a further contribution to freedom from play of the superposition gear.

In an advantageous embodiment of the invention, the worm of the worm gear is produced of plastic or aluminum. The plastic worm is either injection-molded directly onto the second input shaft or onto a metal sleeve that is pressed onto the second input shaft. Producing the worm of plastic has the advantage, besides economical manufacture, that the worm has a high noise damping capacity, which is important, since the worm rotates at high speed. Moreover, when low-density plastic is used, the centrifugal mass of the worm is not excessive, despite its relatively large diameter.

In an advantageous embodiment of the invention, the worm wheel and the planet carrier form a structural unit and are produced as an injection-molded part from one material, such as aluminum or plastic. Plastic has the advantage that the worm wheel is produced by the injection-molding process and requires no subsequent work. A plastic worm wheel is very inexpensive and furthermore has noise-damping properties. In a modification of this version, the planet carrier is made from metal, such as aluminum, and the worm wheel is made from plastic. The worm wheel is injection-molded onto the prefabricated planet carrier. These structural provisions provide increased strength of the planet carrier, greater elasticity, and less thermal expansion compared to a planet carrier made from plastic.

Overall, the refinements and improvements add up to a technically optimized, marketable final control element for superimposed steering engagement.

BRIEF DESCRIPTION OF THE DRAWINGS

Other features and advantages of the invention will be apparent from the description contained below, taken with the drawings, in which.

DESCRIPTION OF THE PREFERRED EMBODIMENTS

Figure 1:
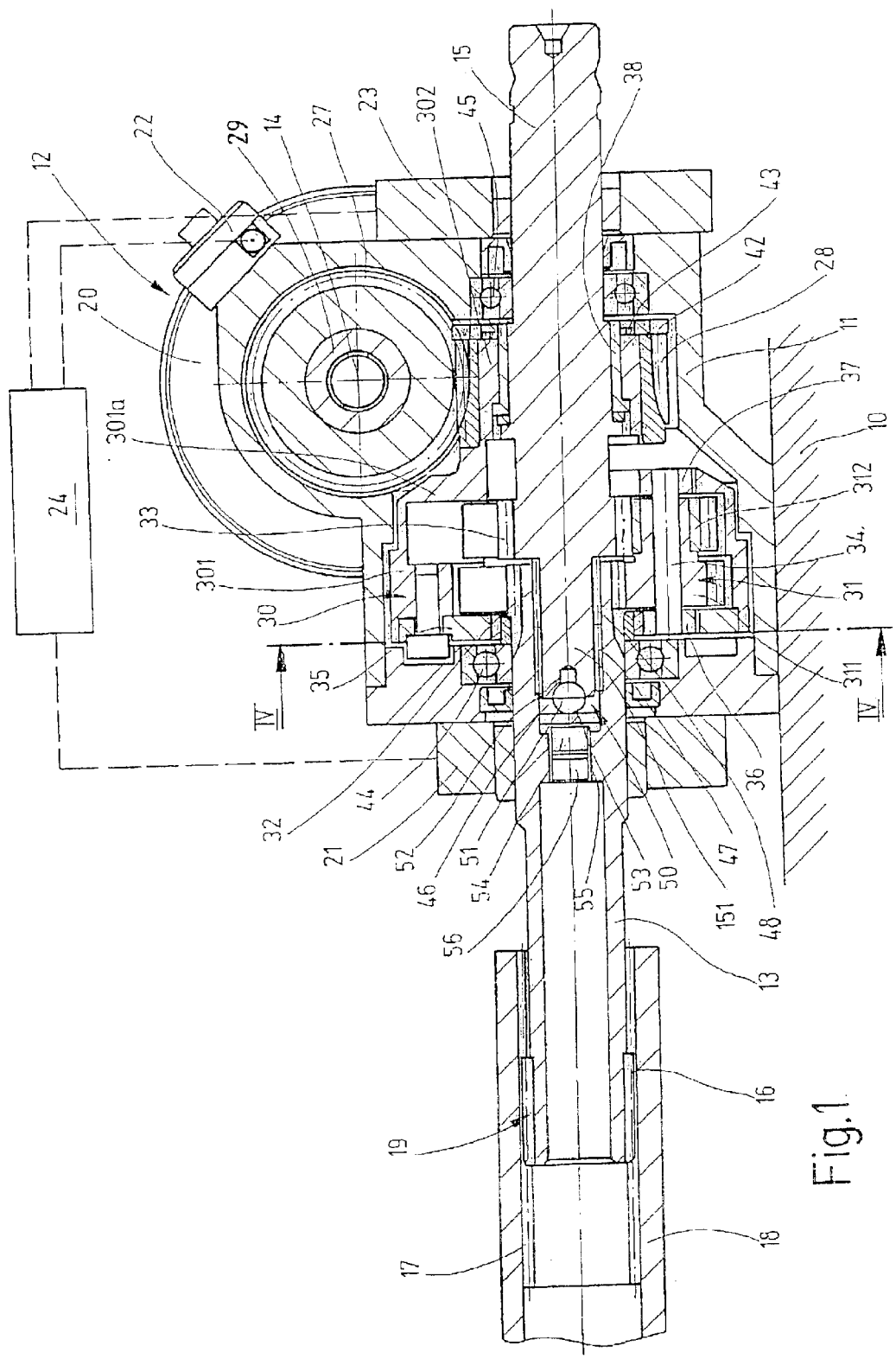
FIG. 1, a longitudinal section through a final control element for superimposed steering engagement in a vehicle steering system.

The final control element shown in FIG. 1 for superimposed steering engagement in a vehicle steering system represents a typical embodiment for installation in the steering column of the vehicle, and it is solidly connected to the vehicle body with a control element housing 11 via a steering column carrier 10, indicated schematically in FIG. 1. The final control element has a superposition gear 12, received in the control element housing 11, and the superposition gear has two input shafts 13, 14 and one output shaft 15; the gear ratio between a change in the rotational angle of the first input shaft 13 and the change in the rotational angle at the output shaft 15 that is coaxial with the first input shaft 13 is variable by means of an electric motor 20, coupled to the second input shaft 14, as a function of predetermined parameters, such as the rotary speed of the first input shaft 13. The first input shaft 13 is provided on its shaft end with an external serration 16, with which an internal serration 17 embodied on a jacket tube 18 meshes. The jacket tube 18 is connected directly to the steering wheel, not shown here. A displacement hub 19 enables an axial displacement of the steering wheel and transmits the manual moment without play to the first input shaft 13. It enables longitudinal adjustment of the steering wheel and allows the steering wheel to dip out of the way in the event of a crash. The second input shaft 14 is the drive shaft of the electric motor 20. Each input shaft 13, 14 and the output shaft 15 are assigned a respective sensor 21, 22, 23 that detects the rotational angle and/or the rotary speed of the shaft. The measurement signals of the sensors 21 through 23 are carried on to a regulating device 24, which controls the electric motor 20. Other measurement variables, such as the travel speed, yaw rate, and the like, can also be evaluated in the regulating device 24. It is also possible for these measurement variables to be evaluated in a further regulating device, whose output signals are then delivered to the regulating device 24.

The superposition gear 12 has a two-stage, modified planetary gear 25 and a self-locking worm gear 26, by way of which latter the planetary gear 25 is driven by the electric motor 20. Self-locking means that only the electric motor 20 can drive the planetary gear 25, but not vice versa. The worm gear 26 comprises a plastic worm 27, which is injection-molded either directly onto the second input shaft 14 or onto a metal sleeve 29 that in turn is pressed onto the second input shaft 14. The worm wheel 28 is seated on a planet carrier 30 of the planetary gear 25 that will be described hereinafter and with it forms a structural unit. The worm wheel 28 and planet carrier 30 are produced as an injection-molded part from one material, such as aluminum or plastic. Plastic has the advantage that the worm wheel 28 is completed with the injection-molded process, is inexpensive, and has noise-damping properties. Alternatively, the planet carrier 30 can be made from aluminum, for instance, and the worm wheel 28 from plastic. Aside from the advantages already named, this leads to greater strength, higher elasticity of the bending arms, to be described below, in the planet carrier 30, and less thermal expansion of the planet carrier 30 relative to a plastic planet carrier.

Besides the planet carrier 30, the two-stage planetary gear 25 has at least three stepped planets 31, supported rotatingly in the planet carrier 30, which are offset from one another by equal rotational angles on a pitch circle that is coaxial with the axis of the planet carrier 30, and also has two sun wheels 32, 33. Each stepped planet 31 comprises a planet wheel 311 and a planet wheel 312, which are connected to one another in a manner fixed against relative rotation. The planet wheels 311 and 312 have different diameters and thus different numbers of teeth. Each stepped planet 31 is seated, slidingly supported, on an shaft 34 inside a pot part 301 of the planet carrier 30, and the pot part is closed by a cap plate 35. The shafts 34 are each received either in a manner fixed against relative rotation or rotatably in a respective bearing point 37, embodied in the bottom 301a of the pot part 301, and a bearing point 36 embodied in the cap plate 35. Extending from the pot part 301 is an integral sleeve part 302 of the planet carrier 30, which is rotatably supported on the output shaft 15 via a slide bearing 38 and which carries the aforementioned worm wheel 28 of the worm gear 26. The planet wheels 311 of the stepped planets 31 mesh with the sun wheel 32, and the planet wheels 312 mesh with the sun wheel 33. The sun wheels 32 and 33 are milled directly onto the first input shaft 13 and the output shaft 15, respectively.

Figure 4:
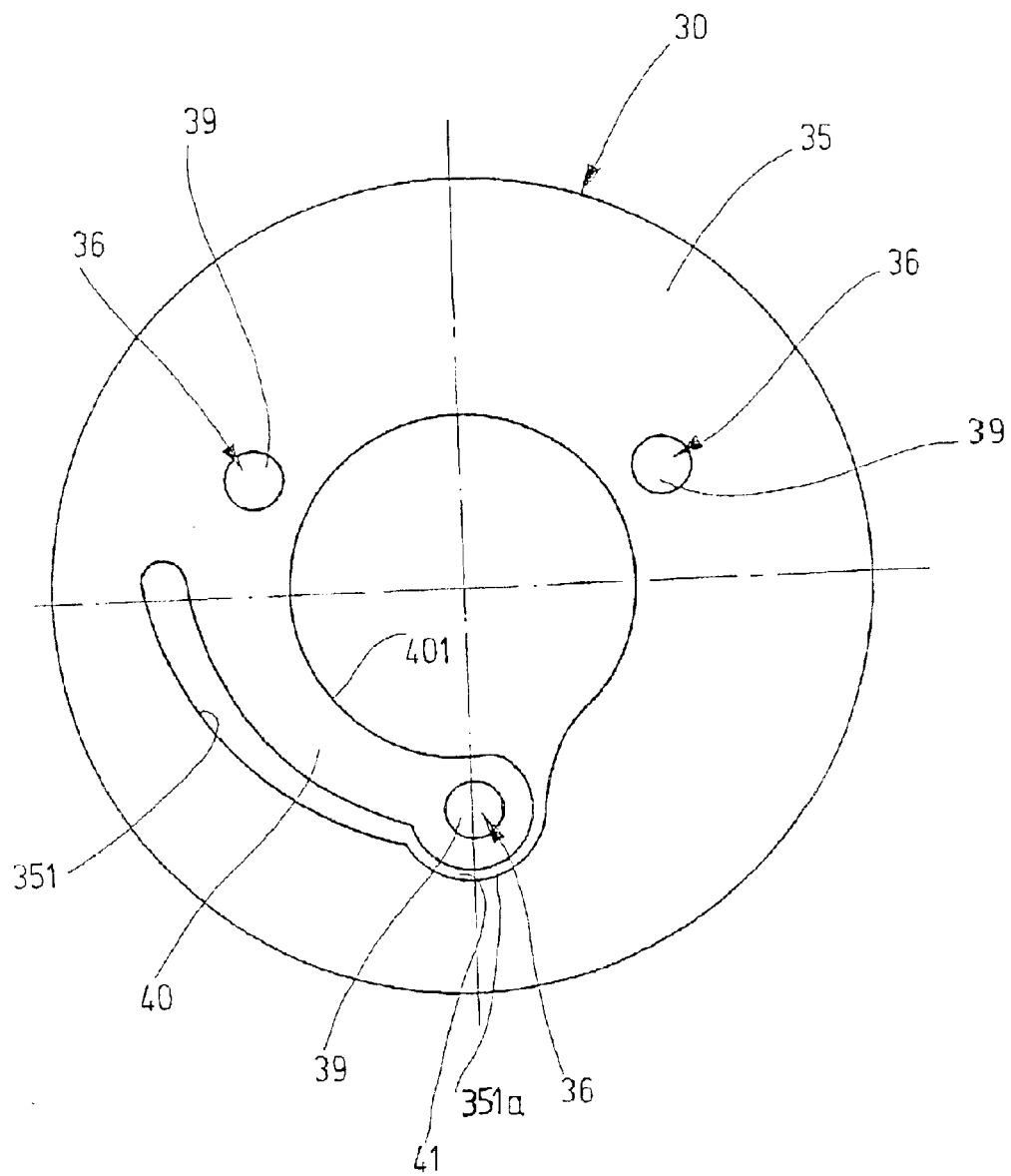
FIG. 4, a plan view in the plane IV—IV of a planet carrier in the superposition gear of FIG. 1.

To furnish freedom from play between the first input shaft 13 and the output shaft 15 of the superposition gear 12, means for suppressing a tooth flank play existing between the stepped planets 31 and the two sun wheels 32, 33 are provided in the planetary gear 25. These means include a radially resilient bearing of at least one of the stepped planets 31 in the planet carrier 30, which is accomplished by a radially resilient embodiment of the bearing points 36 and 37 of this stepped planet 31 in the planet carrier 30. In FIG. 4, the resilient embodiment of the bearing point 36 for the one stepped planet 31 in the cap plate 35 of the planet carrier 30 is shown enlarged. The resilient bearing point 36 is embodied as a bore 39 on a bending arm 40 that is fixed spring-elastically to the cap plate 35. The bending arm 40 is embodied such that with the planetary gear 25 mounted, it generates an approximately radial tensing force oriented toward the meshing sun wheels 32, 33. This tensing force is produced by the fact that the bending arm 40, when the stepped planets 31 are mounted, is pressed in the opposite direction away from the meshing sun wheels 32, 33. The bending arm 40 is curved, with an inner boundary edge 401, which in the exemplary embodiment of FIG. 4 extends concentrically to the axis of the planet carrier 30, and this curve is specifically achieved by cutting the bending arm free from the cap plate 35 in such a way that one end of the arm remains integral with the cap plate 35, while the other end of the arm is rounded in curved fashion. The bearing point 36 is received in the form of a bore 39 in this curved, rounded arm end. Upon an overload, the bending arm 40 presses against a stop 41 embodied on the cap plate 35. This stop 41 is formed by the front part of the cut-away edge 351 of the cap plate 35, which edge extends with gap spacing from the bending arm 40 and merges, in the front part, with a depression 351a adapted to the curved form. In the same way as described above for the bearing point 36, the bearing point 37 is embodied in the pot bottom 301a. In this sense, the above description is identically applicable, except that instead of bearing point 36 and cap plate 35, it should say the bearing point 37 and the pot bottom 301a.

Just like the planetary gear 25, the worm gear 26 is embodied without play. To that end, a second, narrow worm wheel 42 is coupled to the first worm wheel 28 via an annular spring 43. The annular spring 43 assures a tangential equalization of play, because by spring force it presses one tooth flank of each of the worm wheels 28 and 42 against both sides of the tooth flanks of the worm 27.

The first input shaft 13 and the output shaft 15 are each supported via a respective ball bearing 44 and 45 in the control element housing 11. In addition, the output shaft 15, with a bearing peg 151 protruding from one face end, protrudes into a blind-borelike coaxial recess 46 in the first input shaft 13, and the output shaft 15 is braced by its bearing peg 151 on the first input shaft 13, via two needle bearings 47, 48 in the recess 46. The needle bearing 47 rests directly inside the annular region enclosed by the ball bearing 44. Via these needle bearings 47, 48, transverse forces or bending moments that are introduced into the first input shaft 13 via the jacket tube 18 are withstood. If the introduction of a transverse force or a bending moment is precluded by the construction provided, then the needle bearing 48 can be omitted.

An axial equalization of play is provided between the first input shaft 13 and the output shaft 15 that is coaxial with it. To that end, an axial bearing 50 embodied as a slide bearing is disposed between the first input shaft 13 and the output shaft 15, or bearing peg 151 of the output shaft 15. The axial bearing 50 includes a ball 51, which is received in an indentation 52 in the face end of the bearing peg 151 of the output shaft 15, and also includes a disk 53, which is placed in the bottom of the recess 46 in the first input shaft 13. The disk 53 is received axially displaceably in the recess 46 and rests on the face end of a threaded pin 54 that is screwed into a female-threaded bore 55 in the first input shaft 13. As the threaded pin 54 is moved into position, the axial play between the first input shaft 13 and the output shaft 15 decreases, and the ball 51 rests at a point on the disk 53. Once freedom from play is achieved, this status is secured with the aid of a securing screw 56, which can also be screwed into the female-threaded bore 55. The threaded pin 54 and the securing screw 56 are accessible from the free end of the first input shaft 13, this input shaft being embodied as hollow.

Figure 2:
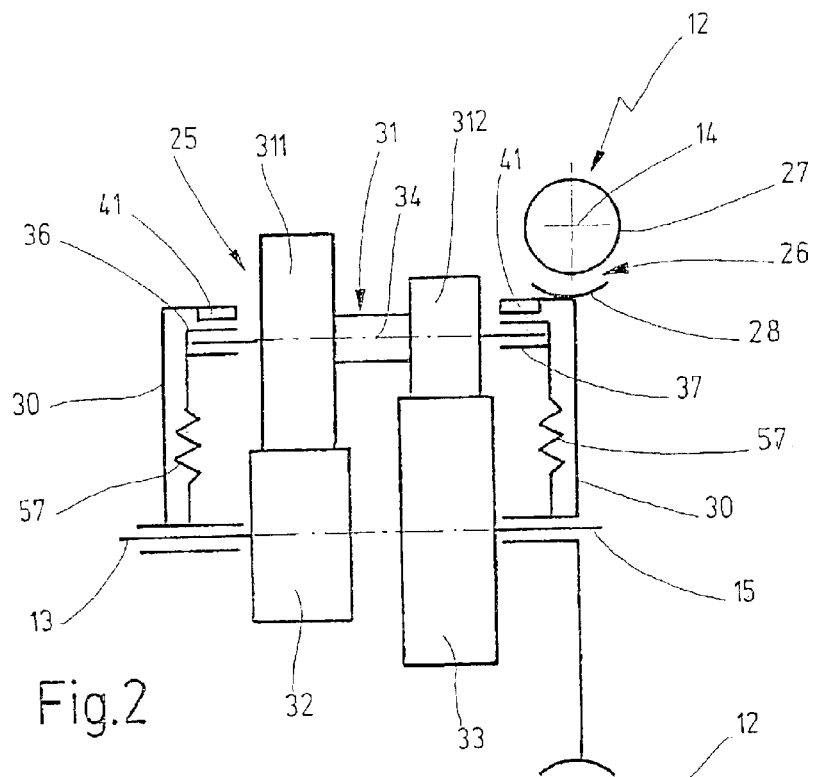
FIG. 2, a basic sketch of a superposition gear in the final control element of FIG. 1.

In FIG. 2, to illustrate the radial equalization of play in the planetary gear 25 described, the superposition gear 12 is shown schematically again. As in FIG. 1, the first input shaft is marked 13, the second input shaft is marked 14, and the output shaft is marked 15. The sun wheel 32 is seated in a manner fixed against relative rotation on the first input shaft 13, and the sun wheel 33 is seated in a manner fixed against relative rotation on the output shaft 15. The worm wheel 28 of the worm gear 26 is connected in a manner fixed against relative rotation to the planet carrier 30, which is supported rotatably in the control element housing 11; in the exemplary embodiment of FIG. 2, it is braced rotatably on the output shaft 15 and on the input shaft 13 via a needle bearing. The sun wheel 32 meshes with the planet wheel 311 of the stepped planet 31, and the sun wheel 33 meshes with the planet wheel 312 of the stepped planet 31; the planet wheels 311, 312 are connected to one another in a manner fixed against relative rotation and—as already described above —are received, rotating on an shaft 34, via a slide bearing. Alternatively, the stepped planet 31 and shaft 34 can be supported slidably in the bearing points 36, 37. The shaft 34, shown in FIG. 2, of the one stepped planet 31 is received radially resiliently in the planet carrier 30. To that end, the bearing points 36, 37 that receive the two ends of the shaft 34 are joined radially resiliently to the planet carrier 30, which is symbolically represented by the tension springs 57 in FIG. 2. The tension springs 57 generate a radial tensing force oriented toward the sun wheels 32, 33. The mechanical stops, which are integrated into the planet carrier 30 and limit the radial deflection outward upon an overload are also shown at 41 in FIG. 2.

Figure 3:
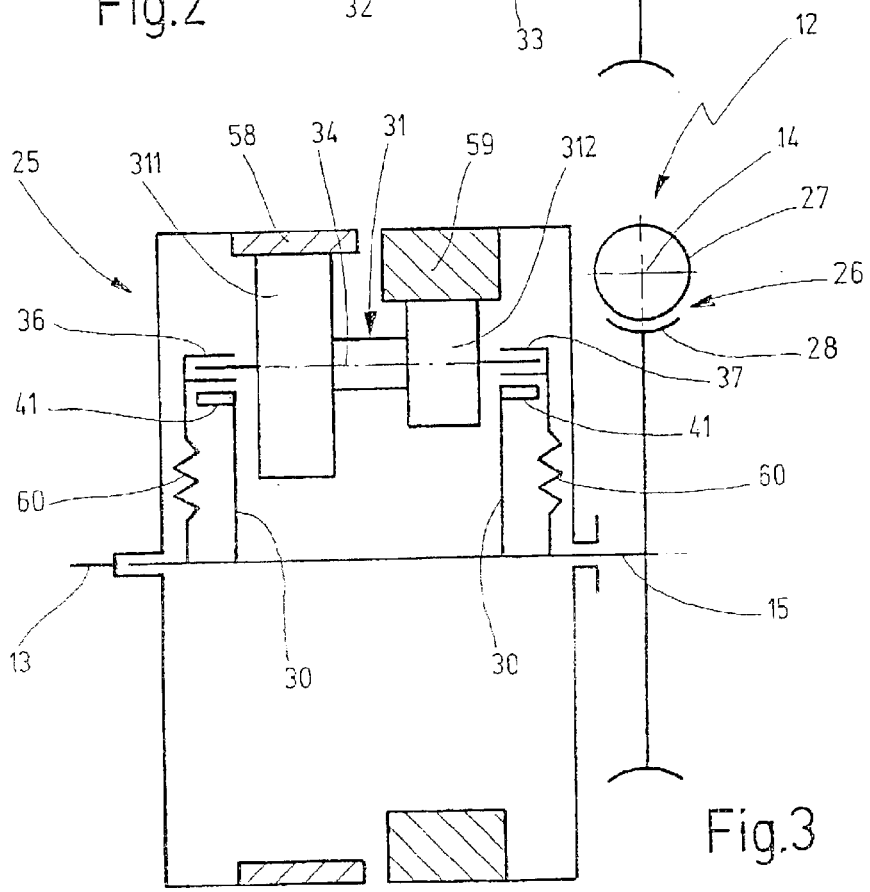
FIG. 3, a basic sketch of the superposition gear in a further exemplary embodiment.

As shown in FIG. 3, this two-stage planetary gear 25 can alternatively be realized by providing that instead of the two sun wheels 32, 33, two ring gears 58, 59 mesh with the stepped planets 31; the ring gear 58 is assigned to the planet wheel 311, and the ring gear 59 is assigned to the planet wheel 312. The ring gear 58 is connected to the first input shaft 13 in a manner fixed against relative rotation, and the ring gear 59 is connected to the output shaft 15 in a manner fixed against relative rotation. For radially equalizing the play, once again one stepped planet 31 is supported radially resiliently, specifically in such a way that the radial force is exerted outward and pushes the planet wheels 311, 312 by nonpositive engagement into the associated ring gears 58, 59. To that end, the bearing points 36, 37 of the shaft 34 that rotatably receives the stepped planet 31 are again supported radially displaceably in the planet carrier 30, the radial force being exerted outward and being symbolically represented in FIG. 3 by compression springs 60. This planetary gear 25 likewise has radial freedom from play, but it is disadvantageous compared to the planetary gear in FIGS. 1 and 2 in that because of the ring gears 58, 59, the diameter of the final control element increases, and moreover, the expensive metal ring gears 58, 59 make the production costs higher.

What is claimed is:

1. A final control element for superimposed steering engagement in a vehicle steering system, comprising, a superposition gear (12) having first and second input shafts (13, 14) and an output shaft (15) coaxial with the first input shaft (13), an electric motor (20) coupled to the second input shaft (14) for varying the superposition ratio between a change in the rotational angle at the first input shaft (13) and the change in the rotational angle at the output shaft as a function of predetermined parameters, the superposition gear (12) having a two-stage, modified planetary gear (25), with a planet carrier (30), at least one stepped planet (31), the at least one stepped planet comprising two axially aligned planet wheels (311, 312) connected to one another in a manner fixed against relative rotation and held rotatably on the planet carrier (30), and two sun wheels (32, 33);

one planet wheel (311) of the at least one stepped planet (31) meshing with one sun wheel (32), and the other planet wheel (312) of the stepped planet (31) meshing with the other sun wheel (33);

the first input shaft (13) being connected to one sun wheel (32), and the output shaft (15) being connected to the other sun wheel (33), in each case in a manner fixed against relative rotation;

the planet carrier (30) being drivable via the second input shaft (14), a self-locking worm gear (26) disposed between the second input shaft (14) and the planet carrier (30), the worm gear (26) including a worm (27) connected to the second input shaft (14) in a manner fixed against relative rotation and a worm wheel (28) connected to the planet carrier (30) in a manner fixed against relative rotation; and a coaxial, smaller worm wheel (42) coupled to the worm wheel (28) via an annular spring (43), in such a way that the tooth flanks of the two worm wheels (28, 42) rest on both sides of the tooth flanks of the worm (27).

2. The final control element of claim 1 wherein the worm (27) of the worm gear (26) is made from plastic.

3. The final control element of claim 1 wherein the planet carrier (30) and the worm wheel (28), connected in a manner fixed against relative rotation to the planet carrier (30), are made as injection-molded parts from one material, such as aluminum or plastic.

4. The final control element of claim 3 wherein the worm (27) of the worm gear (26) is made from plastic.

5. The final control element of claim 1 wherein the planet carrier (30) is made from metal, and the worm wheel (28) is injection-molded of plastic onto the prefabricated planet carrier (30).

6. The final control element of claim 5 wherein the worm (27) of the worm gear (26) is made from plastic.

7. The final control element of claim 1 further comprising means for suppressing a tooth flank play existing between the at least one stepped planet (31) and the sun wheels (32, 33).

8. The final control element of claim 7 wherein the means for suppressing the tooth flank play includes a radially resilient bearing of the stepped planet (31) on the planet carrier (30).

9. The final control element of claim 8 wherein at least three stepped planets (31) are disposed, offset from one another by the same circumferential angle, on the planet carrier (30), at least one of which stepped planets has the radially resilient bearing.

10. The final control element of claim 8 wherein the at least one stepped planet (31) is seated on an shaft (34), whose ends are each received in a respective bearing point (36, 37) embodied in the planet carrier (30), and that the bearing points (36, 37) of the shaft (34) are embodied as a radially resilient.

11. The final control element of claim 10 wherein each of the resilient bearing points (36, 37) is disposed on a bending arm (40), one arm end of which is fixed spring-elastically to the planet carrier (30); and wherein the bending arm (40) is embodied such that once the planetary gear (25) is mounted, it generates a virtually radial tensing force oriented toward the meshing sun wheels (32, 33).

12. The final control element of claim 11 wherein the planet carrier (30) has a pot part (301), which receives the at least one stepped planet (31) and is closed with an annular cap plate (35); and wherein one bending arm (40) each in the bottom (301a) of the pot part (301) and in the cap plate (35) is cut free and near its free arm end carries the bearing point (36 or 37), embodied as a bore (39), for the shaft (34) of the stepped planet (31).

13. The final control element of claim 11 wherein the bending arm (40) is embodied such that in the mounting of the stepped planet (31), in order to adjust the radial tensing force, it is pressed in the opposite direction, away from the meshing sun wheels (32, 33).

14. The final control element of claim 13 wherein the planet carrier (30) has a pot part (301), which receives the at least one stepped planet (31) and is closed with an annular cap plate (35); and wherein one bending arm (40) each in the bottom (301a) of the pot part (301) and in the cap plate (35) is cut free and near its free arm end carries the bearing point (36 or 37), embodied as a bore (39), for the shaft (34) of the stepped planet (31).

15. The final control element of claim 10 wherein the planet carrier (30) has a pot part (301), which receives the at least one stepped planet (31) and is closed with an annular cap plate (35); and wherein one bending arm (40) each in the bottom (301a) of the pot part (301) and in the cap plate (35) is cut free and near its free arm end carries the bearing point (36 or 37), embodied as a bore (39), for the shaft (34) of the stepped planet (31).

16. The final control element of claim 15 wherein the bending arm (40) is embodied in curved form, with an inner boundary edge (401) extending preferably coaxially to the shaft (34) of the planet carrier (30).

17. The final control element of claim 16 further comprising a stop (41) which defines a motion of the bending arm (40) oriented away from the meshing sun wheels (32, 33) is disposed both on the bottom (301a) of the pot part (301) and in the cap plate (35), and preferably that the stop (41) is formed by the cut-away edge (351) of the bottom (301a) of the pot part (301) and by the cap plate (35), respectively, which latter extends at a gap spacing from the bending arm (40).

18. The final control element of claim 15 further comprising a stop (41) which defines a motion of the bending arm (40) oriented away from the meshing sun wheels (32, 33) is disposed both on the bottom (301a) of the pot part (301) and in the cap plate (35), and preferably that the stop (41) is formed by the cut-away edge (351) of the bottom (301a) of the pot part (301) and by the cap plate (35), respectively, which latter extends at a gap spacing from the bending arm (40).

19. The final control element of claim 18 wherein the free end of the bending arm (40) is embodied in curved form, and the stop (41) on the bottom (301a) of the pot part (301) and on the cap plate (35) is in each case embodied as a depression (351a), adapted to the curved form, in the cut-away edge (351).

20. A final control element for superimposed steering engagement in a vehicle steering system, comprising
   a superposition gear (12) having first and second input shafts (13, 14) and an output shaft (15) coaxial with the first input shaft (13),
   an electric motor (20) coupled to the second input shaft (14) for varying the superposition ratio between a change in the rotational angle at the first input shaft (13) and the change in the rotational angle at the output shaft as a function of predetermined parameters, such as the rotary speed of the first input shaft (13),
   the superposition gear (12) having a two-stage, modified planetary gear (25), with a planet carrier (30), at least one stepped planet (31), the at least one stepped planet comprising two axially aligned planet wheels (311, 312) connected to one another in a manner fixed against relative rotation and held rotatably on the planet carrier (30), and two ring gears (58,59) having internal toothing,
   one planet wheel (311) of the at least one stepped planet (31) meshing with one ring gear (58), and the other planet wheel (312) of the stepped planet (31) meshing with the other ring gear (59);
   the first input shaft (13) being connected to the first ring gear (58), and the output shaft (15) being connected to the other ring gear (59), in each case in a manner fixed against relative rotation;
   the planet carrier (30) being drivable via the first input shaft (14),
   a self-locking worm gear (26) disposed between the second input shaft (14) and the planet carrier (30), the worm gear 26 including a worm (27) connected to the second input shaft (14) in a manner fixed against relative rotation and a worm wheel (28) connected to the planet carrier (30) in a manner fixed against relative rotation; and
   a coaxial, smaller worm wheel (42) coupled to the worm wheel (28) via an annular spring (43), in such a way that the tooth flanks of the two worm wheels (28, 42) rest on both sides of the tooth flanks of the worm (27).

21. The final control element of claim 20 further comprising means for suppressing a tooth flank play existing between the at least one stepped planet (31) and the ring gears (58, 59).

22. The final control element of claim 21 wherein the means for suppressing the tooth flank play includes a radially resilient bearing of the stepped planet (31) on the planet carrier (30).

23. The final control element of claim 22 wherein the at least one stepped planet (31) is seated on an shaft (34), whose ends are each received in a respective bearing point (36, 37) embodied in the planet carrier (30), and that the bearing points (36, 37) of the shaft (34) are embodied as a radially resilient.

24. The final control element of claim 23 wherein each of the resilient bearing points (36, 37) is disposed on a bending arm (40), one arm end of which is fixed spring-elastically to the planet carrier (30); and wherein the bending arm (40) is embodied such that once the planetary gear (25) is mounted, it generates a virtually radial tensing force oriented toward the meshing ring gears (58, 59).

25. The final control element of claim 24 wherein the planet carrier (30) has a pot part (301), which receives the at least one stepped planet (31) and is closed with an annular cap plate (35); and wherein one bending arm (40) each in the bottom (301a) of the pot part (301) and in the cap plate (35) is cut free and near its free arm end carries the bearing point (36 or 37), embodied as a bore (39), for the shaft (34) of the stepped planet (31).

* * * * *